(12) United States Patent
Legouet-Camus et al.

(10) Patent No.: US 6,381,221 B1
(45) Date of Patent: Apr. 30, 2002

(54) SYSTEM AND METHOD FOR MONITORING LINE PERFORMANCE IN A DIGITAL COMMUNICATION NETWORK

(75) Inventors: Cyril Legouet-Camus, Boulogne; Edith Felix, Paris; Claudine Lorion, La Gaude; Eric Francois Martin, Cagnes sur Mer; Didier Ounkowski; Thierry Roman, both of Nice, all of (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/213,572

(22) Filed: Dec. 17, 1998

(30) Foreign Application Priority Data

Mar. 18, 1998 (EP) .............................. 98480010

(51) Int. Cl.⁷ .......................... H04L 1/00; H04L 12/26; H04J 1/16; G08C 15/00; H04M 1/24
(52) U.S. Cl. ................. 370/252; 370/217; 370/242; 370/248; 379/22; 379/32
(58) Field of Search ............................... 370/252, 217, 370/231, 236, 248, 250; 379/14, 15, 32, 34, 133, 207; 714/1, 2, 3, 4, 47, 26

(56) References Cited

U.S. PATENT DOCUMENTS

| | | | | |
|---|---|---|---|---|
| 3,956,601 A | * | 5/1976 | Harris et al. | 179/175 |
| 4,905,171 A | * | 2/1990 | Kiel et al. | 364/551 |
| 5,390,188 A | * | 2/1995 | Dawson | 371/20 |
| 5,689,546 A | * | 11/1997 | Sheets et al. | 379/34 |
| 5,799,017 A | | 8/1998 | Gupta et al. | |
| 5,864,542 A | | 1/1999 | Gupta et al. | |
| 5,982,743 A | * | 11/1999 | Kusano | 370/217 |
| 6,028,914 A | * | 2/2000 | Lin et al. | 379/14 |
| 6,108,800 A | * | 8/2000 | Asawa | 714/47 |
| 6,115,751 A | | 9/2000 | Tan et al. | |
| 6,175,570 B1 | | 1/2001 | Cukler et al. | |

* cited by examiner

Primary Examiner—Wellington Chin
Assistant Examiner—M. Phan
(74) Attorney, Agent, or Firm—A. Sidney Johnston; Cesari and McKenna, LLP

(57) ABSTRACT

System for monitoring the performance of at least one line at a node of a digital communication network, such a system including a set of hardware registers associated with the line for registering line performance information associated therewith, a set of counters associated with the line, each counter defining a parameter depending on the line performance information, and a processing unit for, during a predetermined period of time, gathering the line performance information from the counters in a performance report to be sent to a network management unit. One table (22, 24 or 26) is associated with the line and stores all the data necessary to read the parameter for each counter of the associated set of counters with the line, and a processing machine (20) reads the table, sequentially computes the parameters defined by each counter by using the data stored in the table, and sequentially updates the counters.

41 Claims, 3 Drawing Sheets

SYSTEM AND METHOD FOR MONITORING LINE PERFORMANCE IN A DIGITAL COMMUNICATION NETWORK

FIELD OF THE INVENTION

The present invention relates to systems for monitoring the entities of a communication network through continuous collection and analysis of data derived by observing their performance. More particularly, the invention relates to a system and a method for monitoring the performance of the lines in a digital communication network.

BACKGROUND

There are a variety of strategies governing maintenance operations associated with today's telecommunications networks. While maintenance strategies are fairly diverse in their procedural details, they are usually based upon a common set of guiding principles (or philosophies) that are intended to fulfill the general needs and objectives of individual network providers. Maintenance strategies rely upon three fundamental operations tools: Surveillance, Testing and Restoration.

Surveillance refers to the real-time, non-intrusive monitoring of the various components of a network, so that performance degradations can be identified before customer service is adversely affected.

The surveillance is principally performed by the performance monitoring which is defined in the American National Standard for Telecommunications "Layer 1 In-Service Digital Transmission Performance Monitoring" as being the monitoring of a particular entity's health through continuous collection and analysis of data derived by observing its performance. In the context of this standard, the term performance monitoring refers to the set of functions and capabilities necessary for a network element to gather, store, threshold and report performance data associated with its monitored digital transmission entities. These performance-related data elements are termed performance parameters.

When applied to lines as entities of the network, the performance monitoring relates to all digital line communications for line speeds starting from 1.544 Mbps ($T_1$) up to 155 Mbps ($OC_3$) and above.

Line performance monitoring relies on a set of performance counters which is defined for each digital line. These counters are capital for services that do not define any other performance counters such as voice. They are also important for digital data, for instance HDLC.

At each node of a communication network to be monitored, a line interface includes several successive hardware elements such as a front end transformer, a line transceiver and a framer. Usually, a processor is in charge of configuring the hardware elements and also managing alarms and line performance parameters. So, the processor collects the defects and anomalies and generates performance counters by running a specific software process.

Such a line performance monitoring presents several drawbacks. First, it is timing dependent insofar as several counters require a complex timing adjustment as, for example, for the parameters depending on the failures.

This line performance monitoring is also totally dependent on hardware. As a matter of fact, assuming a $T_1$ interface is replaced by an $E_1$ interface, the framer has to be changed and therefore, all register addresses and contents enabling to process line performance parameters are different.

Furthermore, the high number of line performance parameters increases the technical complexity since the total code length is usually proportional to the number of parameters which are monitored by counters. This number which can be very important increases the complexity, as for example in SONET requiring 49 such counters.

SUMMARY OF THE INVENTION

It is why the object of the invention is to provide a new system and process of line performance monitoring using a software process which is independent on hardware and timing.

To achieve the foregoing object, the invention relates to a system for monitoring the performance of at least one line at a node of a digital communication network, such a system including a set of hardware registers associated with the line for registering line performance information associated therewith, a set of counters associated with the line, each counter defining a parameter depending on the line performance information, and a processing unit for, during a predetermined period of time, gathering the line performance information from the hardware registers, computing the parameter and writing the parameters defined by the counters in a performance report to be sent to a network management unit. The system also comprises one table associated with each line for storing all the data necessary to read the parameter for each counter of the set of counters associated with this line, and a processing machine for reading the table, sequentially computing the parameters defined by each counter by using the data stored in the table, and sequentially updating the counters.

Another aspect of the invention is a process of monitoring the performance of at least one line at a node of a digital communication network using the above system comprising the steps of reading from a sub-table of the table associated to a counter to be updated, the data necessary to read performance information on the line from the associated hardware registers and to compute the parameter for this counter, reading the hardware registers by using a first part of the data read in the sub-table, computing the parameter for this counter by using a second part of the data read in the sub-table, updating the counter by the computed parameter, and writing this parameter in the performance report to be sent to the network management unit.

BRIEF DESCRIPTION OF THE DRAWINGS

The objects, features and advantages of the invention will be more readily understood in conjunction with the accompanying drawings, in which.

DETAILED DESCRIPTION OF THE INVENTION

Figure 1:
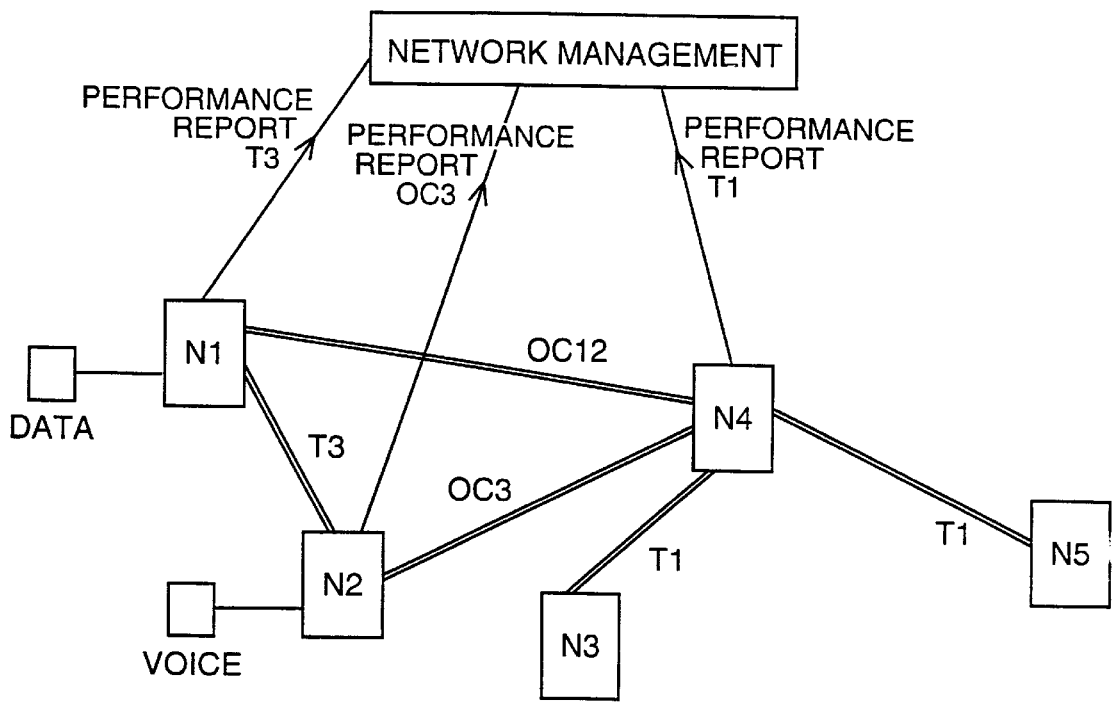
FIG. 1 is a schematic diagram representing a digital communication network wherein the invention can be implemented.

FIG. 1 shows a communication network wherein the invention can be implemented. This network includes a plurality of nodes such as $N_1$, $N_2$, $N_3$, $N_4$ and $N_5$ which can receive voice (e.g. $N_2$) or data (e.g. $N_1$) from attached Terminals. Such nodes are connected by various types of lines. Thus, $N_1$ is connected to $N_2$ by a $T_3$ line, $N_1$ is connected to $N_4$ by an OC12 line, $N_2$ is connected to $N_4$ by an $OC_3$ line, and $N_4$ is connected to $N_3$ and $N_5$ by $T_1$ lines.

Each node is composed of a raw assembly (rack) and several plugged cards interfacing directly the lines interconnecting the nodes. The system of the invention is implemented in three nodes $N_1$, $N_2$ and $N_4$ which are reporting a performance report for respectively $T_3$, $OC_3$ and $T_1$ lines to a Network Management which can be typically the IBM system Net View 6000 running on a RISC System 6000 or the Hewlett Packard, Openview (Registered Trademarks).

Figure 2:
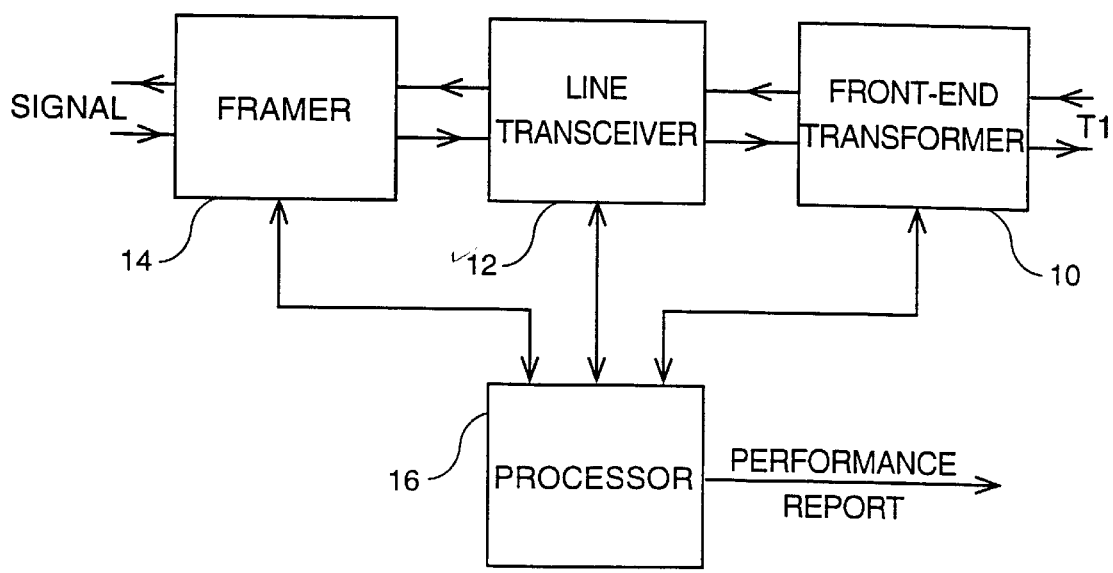
FIG. 2 is a block-diagram of a card interfacing a communication line in a node of a network illustrated in FIG. 1.

A card of a node interfacing a $T_1$ line is illustrated in FIG. 2. It is composed of a front-end transformer 10 which assures the protection of overvoltage, the ground isolation (via a DC-DC transformer) and the impedance adjustment, of a line transceiver 12 for the digitalization of the analog signal received on the $T_1$ line, and of a framer 14 for detecting frames according to the standards and providing time slots for data output.

A processor 16 is in charge of configuring the hardware of the card, and also managing alarms and performance parameters. Processor 16 collects the defects and anomalies from hardware registers associated with front-end transformer 10, line transceiver 12 and framer 14. Then, by running a software process according to the invention, processor 16 generates parameters in dedicated counters. Finally, a performance report is sent from processor 16 to the Network Management as illustrated in FIG. 1.

Figure 3:
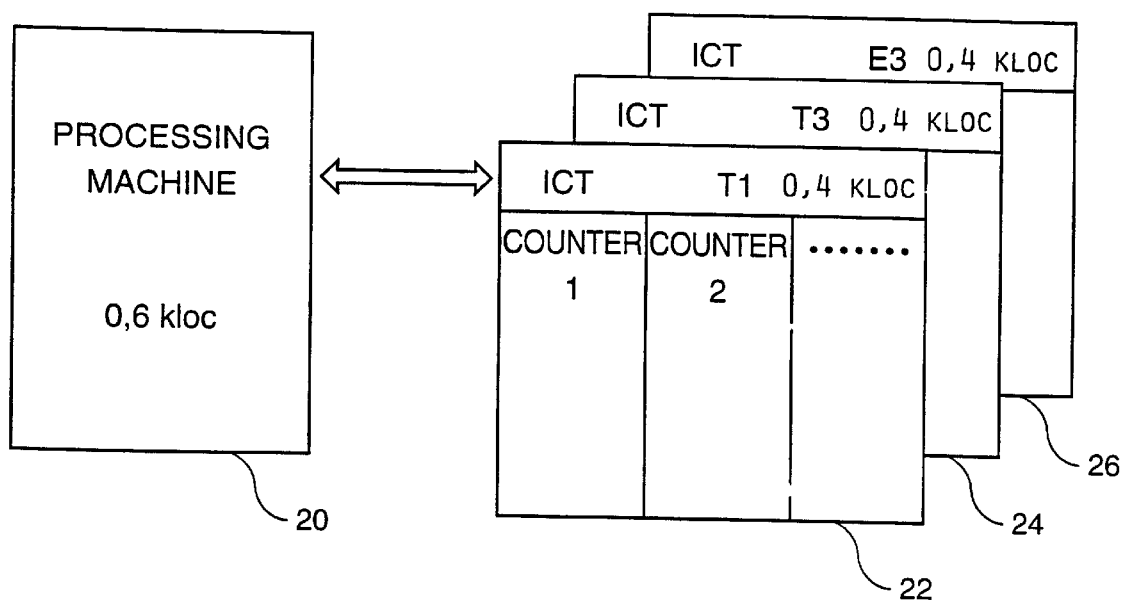
FIG. 3 is a flow-chart of the processing machine incorporated in a system according to the invention.

To implement the invention, processor 16 includes the essential features illustrated in FIG. 3, that is a unique processing machine 20 in charge of processing the same process for all line interfaces, and a set of interface counter tables (ICT) such as tables 22 for interface $T_1$, 24 for $T_3$ and 26 for $E_3$. Each interface counter table includes a counter table for each counter to be processed. The processing machine (which is a program, written for instance in C language) represents about 0.6 kloc whereas each interface counter table represents about 0.4 kloc in the RAM of the processor.

The definition of a counter consists in a conjunction of conditions on the hardware registers or software table values. The complete equation is described by a set of conditions bounded by logical operators. So, each counter is represented in the interface counter table by a counter table comprising a set of sub-tables. Each sub-table has the following format:
- the address of the hardware register or the software table to be read in order to determine the line performance,
- a type such as char, short, long (as defined by C language), which is the size of the entity considered,
- an offset which is used when the interface includes several lines of the same type for determining the other addresses from an initial address,
- a mask. Only a few bits may be relevant (especially for framer monitoring registers that contain more than one type of data per register),
- a shift, as data masked may not be on lower bits,
- a threshold which is the threshold value if relevant or zero if no thresholding is applied,
- a condition of operation equal, greater than, less than or no comparison, with respect to the threshold value,
- a logical operator (AND, OR) which bounds with the next sub-table. If logical operation is STOP-L, there is no more condition sub-table for this counter. The line performance parameter is equal to the result of this logical operation.

It must be noted that the number of line performance counters defined in each ICT table is determined by standards giving parameters definition according to the line speed. For instance Table 4 of T1N1 standards gives the $T_1$ line parameter definitions whereas the parameter definitions for SONET lines are given in Table 12. These definitions are used to determine which hardware registers and which software variables will be used to code the counter.

Figure 4:
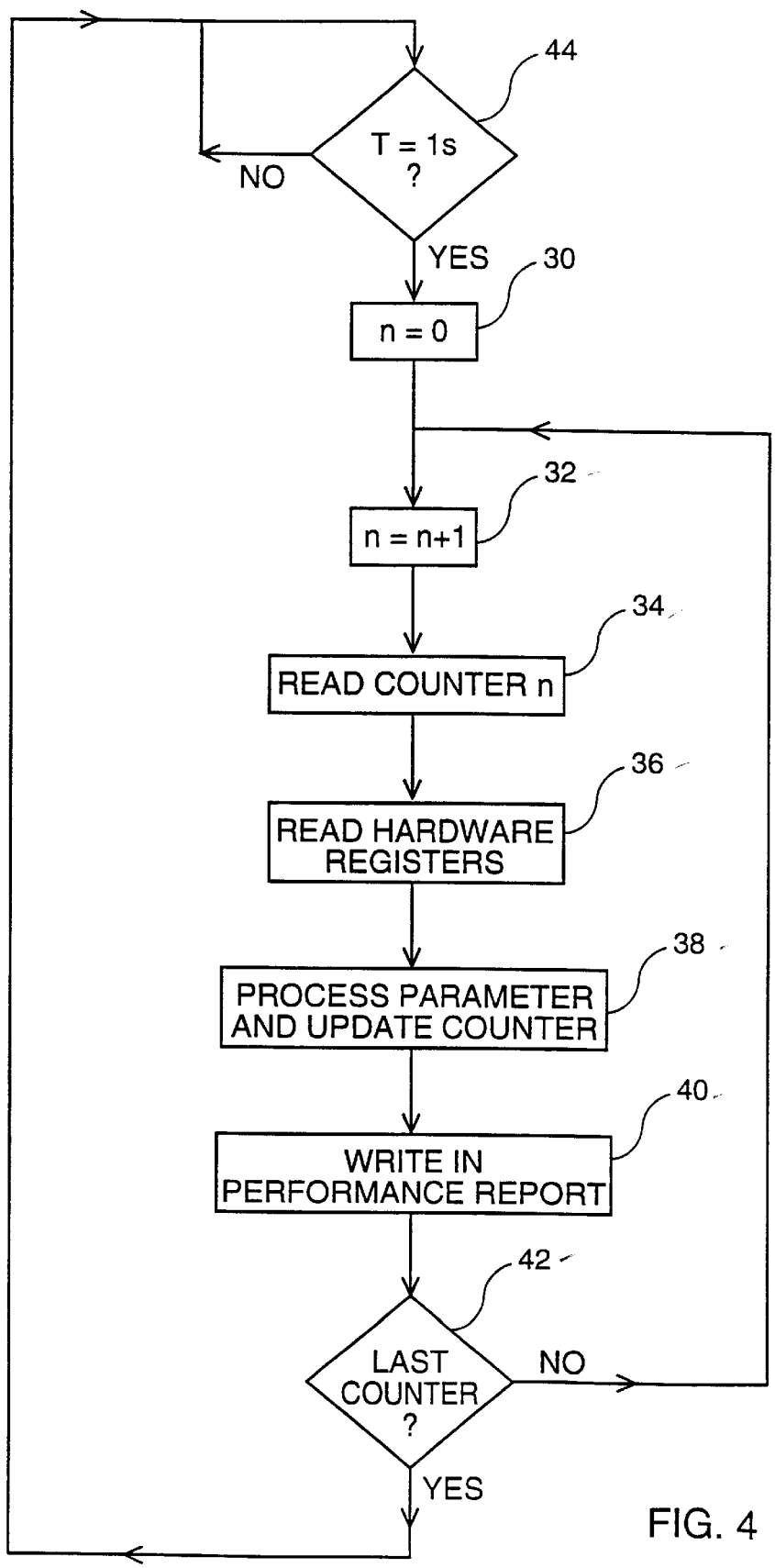
FIG. 4 is a schematic representation of the essential features used in a system according to the invention.

The algorithm followed by the processing machine for updating each counter is now described in reference to FIG. 4. Assuming that there are n counters for the interface, variable n has been set to zero at step 30. This variable is incremented for each counter at step 32. Then, the information associated with counter n is read at step 34, from the ICT table. This information provides the addresses of the hardware registers (or software tables) to be read at step 36. Note that, further to the address of a hardware register, the information in the ICT table determines the length of data to be read, a mask defining the selective reading of bits in the register, and a shift to the right enabling a correct reading of the value.

Then, the parameters are processed at step 38 by using the conditional operator of the counter table for comparing the read value to the threshold. The different conditions may be combined with the logical operator defined in the counter table. Note that an operator is used to indicate that the counter is not defined for this type of framing. Finally, the result of the operations at step 38 is used to update the processed counter.

Then, the new counter value is written in a performance report at step 40. Note that such a performance report can be forwarded to the network management at the end of each period during which all the counters have been processed or a consolidated performance report can be forwarded every period of time such as every 20 s or every minute.

At step 42, it is determined whether the counter being processed is the last counter. If not, the processing machine returns to step 32 where n is incremented. If so, the process goes to step 44 where a waiting loop is run until the period of time T=1 second has been lapsed and starting again the processing algorithm.

If there are several line interfaces for the same node as illustrated in FIG. 3, the same processing is used for processing the counters associated with the different lines, but a different interface counter table (ICT) is used for each different line. In such a case, either all the counters associated with the different interfaces (for instance interfaces $T_1$, $E_2$ and $E_3$) are sequentially processed in the same period of time T, or the first interface is processed during a first period of time T, the second interface is processed during a second period of time T, etc. Note that, a same interface can include several lines of the same type (e.g. $T_1$). In such a case, only one ICT table is used for the lines of the same type except that the addresses of the hardware registers are different and defined by an offset information with respect to an initial address.

Figure 5:
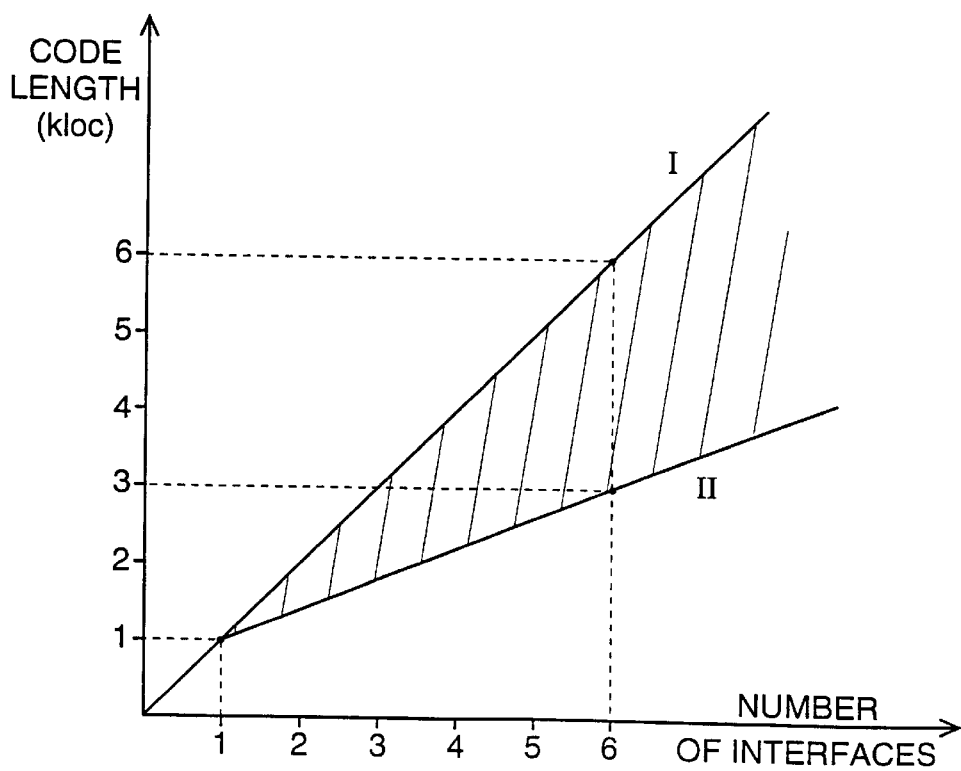
FIG. 5 is a diagram representing the total code length with respect to the number of interfaces without using the invention and with the use of the invention.

As illustrated in FIG. 5, the implementation of the invention enables to save memory space. Thus, the prior technique requires about 1 kloc (thousands of lines of code) of high level language C code for an interface associated with a medium number of counters, such as 15 counters for a $T_1$ line. Insofar as a different interface requires different counters, everything has to be coded again resulting in a size of code proportional to the number of interfaces. This is illustrated by curve I which shows that 1 kloc is required for 1 interface, 2 kloc are required for 2 interfaces, 3 kloc are required for 3 interfaces, and so on.

With the use of the invention, about 0.6 kloc are required for the processing machine and about 0.4 kloc are required for each interface. Therefore, though the same total of 1 kloc is required for the first interface, the quantity of kloc which is required for several interfaces is less than with the prior technique as shown by curve II. Thus, with 6 interfaces, only 3 kloc are necessary if the invention is implemented whereas a total of 6 kloc is required in the prior technique.

What is claimed is:

1. System for monitoring the performance of at least one line at a node of a digital communication network, said system including a set of hardware registers associated with said at least one line for registering line performance information associated therewith, a set of counters associated with said at least one line, each counter defining a parameter depending on said line performance information, and a processing unit (16) for, during a predetermined period of time, gathering said line performance information from said hardware registers, computing said parameter and writing the parameters defined by said counters in a performance report to be sent to a network management unit;

said system being characterized in that it comprises:
at least one line table (22, 24 or 26) associated with said at least one line and storing all the data necessary to read said line performance information from said hardware registers and to compute said parameter for each counter of said set of counters associated with said at least one line; and
a processing machine (20) for reading said line table, sequentially computing the parameters defined by each one of said set of counters by using the data stored in said line table, and sequentially updating said counters.

2. System according to claim 1, wherein said processing unit (16) is included in an interface card located at the interface between said at least one line and said node, said interface card also comprising a front-end transformer (10), a line transceiver (12) and a framer (14) each including one or several hardware registers.

3. System according to claim 1 or claim 2, wherein said at least one line table (22, 24 or 26) comprises a plurality of counter tables, each one defining said data necessary to read said line performance information from said hardware registers for each of said set of counters.

4. System according to claim 3, wherein each one of said counter tables comprises a plurality of sub-tables each being associated with a hardware register for storing at least the address of said hardware register and a logical operator, said sub-tables defining conditions on said hardware registers which are bounded by said logical operators to get said parameter for said counter.

5. Process of monitoring the performance of at least one line at a node of a digital communication network using a system according to claims 1 or 2, being characterized by the steps of:
reading from a counter table of said at least one table associated to a counter to be updated, the data necessary to read performance information on a line from said hardware registers associated with said line and to compute said parameter for said counter;
reading said hardware registers by using a first part of said data read in said counter table;
computing said parameter for said counter by using a second part of said data read in said counter table;
updating said counter by said computed parameter; and
writing said parameter in the performance report to be sent to said network management unit.

6. Process according to claim 5, wherein said first part of data includes the addresses of said hardware registers, the length of data to be read and may also include the offset to be used in such addresses, a mask enabling a selective reading of bits and a shift enabling a correct reading.

7. Process according to claim 6, wherein said second part of data includes conditional operators to compare the read data to a predetermined threshold, and logical operators for combining the data resulting from the application of said conditional operators.

8. Process according to any one of claims 4 to 7, being performed for each sub-table associated with a counter of said set of counters during a predetermined period of time.

9. System for monitoring the performance of a plurality of heterogeneous communication lines at a node of a digital communication network comprising
a processor for executing a single line interface process for the plurality of lines;
at least one interface counter table, the interface counter table including a counter table for each line performance counter, the line performance counter being associated with each of the plurality of lines, the line performance counter being accessed by the line interface process to compute performance parameters associated with said each of the plurality of lines.

10. System according to claim 9, wherein said processor is included in an interface card located at the interface between said each plurality of lines and said node, said interface card also comprising a front-end transformer (10), a line transceiver (12) and a framer (14) each including at least one hardware register.

11. System according to claim 10, wherein said counter table defines data necessary to read performance information from said hardware registers.

12. System according to claim 11, wherein said counter table comprises a plurality of sub-tables each being associated with a hardware register for storing at least the address of said hardware register and a logical operator, said sub-tables defining conditions on said hardware registers which are bounded by said logical operators to compute said performance parameters.

13. Process of monitoring the performance of at least one line at a node of a digital communication network using a system according to claim 9, being characterized by the steps of:
reading from a counter table the data necessary to read performance information from said hardware registers and to compute said performance parameters;
reading said hardware registers by using a first part of said data read in said counter table;
computing said performance parameters by using a second part of said data read in said counter table;
updating said counter table with said computed performance parameter; and writing said performance parameter in a performance report.

14. Process according to claim 13, wherein said first part includes the addresses of said hardware registers and the length of data to be read.

15. Process according to claim 14, wherein said second part includes condition operators to compare the read data to a predetermined threshold, and logical operators for combining the data resulting from the application of said conditional operators.

16. Process according to claim 12, being performed for each sub-table during a predetermined period of time.

17. A node for carrying out the method according to claim 5.

18. A communication network comprising at least one node according to claim 1.

19. A communication network wherein said at least one line further comprises:
   a T1 line, OR a T3 line, OR a O12 line, OR a OC3 line OR a SONET line.

20. A communication network wherein said at least one line further comprises:
   a line described in American National Standard for Telecommunications.

21. An apparatus for monitoring performance of a plurality of communications lines, comprising:
   a set of hardware registers associated with each communications line of said plurality of communications lines, the plurality of communications lines being subdivided into different types of communications lines, and said set of hardware registers for each type of communications line chosen as appropriate for that type of communications line;
   a computer memory;
   a processor to read all hardware registers of said set of hardware registers, said processor to compute, in response to values read from said hardware registers, values for counters used to monitor performance of each communications line of said plurality of communications lines, and to store results of the computations in said computer memory.

22. The apparatus as in claim 21 further comprising:
   means for periodically updating, upon expiration of a predetermined period of time, said counters.

23. The apparatus as in claim 21 further comprising:
   said counters are arranged in sets, with a said set of counters arranged for each communications line of said plurality of communications lines, each said set of counters stored in a counter table in said computer memory.

24. The apparatus as in claim 23 further comprising:
   each said counter table also having stored therein a logical operator, said processor responsive to said logical operator and responsive to values read from said hardware registers, to calculate said counter values.

25. The apparatus as in claim 21 further comprising:
   said different types of communications lines includes a T1 line.

26. The apparatus as in claim 21 further comprising:
   said different types of communications lines includes a T2 line.

27. The apparatus as in claim 21 further comprising:
   said different types of communications lines includes a OC3 line.

28. The apparatus as in claim 21 further comprising:
   said different types of communications lines includes a OC12 line.

29. The apparatus as in claim 21 further comprising:
   said different types of communications lines includes a SONET line.

30. The apparatus as in claim 21 further comprising:
   said different types of communications lines includes a line described in American National Standard for Telecommunications.

31. An apparatus for monitoring performance of a plurality of communications lines, comprising:
   a set of hardware registers associated with each communications line of said plurality of communications lines, the plurality of communications lines being subdivided into different types of communications lines, and said set of hardware registers for each type of communications line chosen as appropriate for that type of communications line;
   a computer memory;
   means for reading all hardware registers of said set of hardware registers;
   means for computing, in response to values read from said hardware registers, values for counters used to monitor performance of each communications line of said plurality of communications lines, and to store results of the computations in said computer memory.

32. A method for monitoring performance of a plurality of communications lines, comprising:
   storing line data in a set of hardware registers associated with each communications line of said plurality of communications lines, the plurality of communications lines being subdivided into different types of communications lines, and said set of hardware registers for each type of communications line chosen as appropriate for that type of communications line;
   reading all hardware registers of said set of hardware registers by a processor;
   computing, in response to values read from said hardware registers, values for counters used to monitor performance of each communications line of said plurality of communications lines; and,
   storing results of the computations in a computer memory.

33. The method of claim 32 further comprising:
   updating, upon expiration of a predetermined period of time, said counters.

34. The method of claim 32 further comprising:
   arranging counters in sets, with a said set of counters arranged for each communications line of said plurality of communications lines, each said set of counters stored in a counter table in said computer memory.

35. The method of claim 32 further comprising:
   storing in each said counter table a logical operator, said processor responsive to said logical operator and responsive to values read from said hardware registers, to calculate said counter values.

36. An apparatus for monitoring performance of a plurality of communications lines, comprising:
   a set of hardware registers associated with each communications line of said plurality of communications lines;
   a computer memory;
   a processor to read all hardware registers of said set of hardware registers, said processor to compute, in response to values read from said hardware registers, values for counters used to monitor performance of each communications line of said plurality of communications lines, and to store results of the computations in said computer memory.

37. The apparatus as in claim 36, further comprising;
   said plurality of communications lines being subdivided into different types of communications lines, and said set of hardware registers for each type of communications line chosen as appropriate for that type of communications line.

38. A method for monitoring performance of a plurality of communications lines, comprising:

associating a set of hardware registers with each communications line of said plurality of communications lines;

reading by a processor all hardware registers of said set of hardware registers;

computing by said processor, in response to values read from said hardware registers, values for counters used to monitor performance of each communications line of said plurality of communications lines, and to store results of the computations in said computer memory.

39. The method as in claim 38, further comprising:

subdividing said plurality of communications lines into different types of communications lines, and said set of hardware registers for each type of communications line chosen as appropriate for that type of communications line.

40. A computer readable media containing instructions for execution on a processor for the practice of the method of claim 5 or claim 32 or claim 38.

41. Electromagnetic signals propagating over a computer network, said electromagnetic signals carrying information, said information having instructions for execution on a processor for the practice of the method of claim 5 or claim 32 or claim 38.

* * * * *